United States Patent
Luzynski et al.

(10) Patent No.: US 11,037,430 B1
(45) Date of Patent: Jun. 15, 2021

(54) SYSTEM AND METHOD FOR PROVIDING REGISTERED SEX OFFENDER ALERTS

(71) Applicants: Louis J. Luzynski, Covington, LA (US); L. Benjamin Luzynski, Covington, LA (US)

(72) Inventors: Louis J. Luzynski, Covington, LA (US); L. Benjamin Luzynski, Covington, LA (US)

(*) Notice: Subject to any disclaimer, the term of this patent is extended or adjusted under 35 U.S.C. 154(b) by 0 days.

(21) Appl. No.: 16/839,917

(22) Filed: Apr. 3, 2020

Related U.S. Application Data

(60) Provisional application No. 62/835,783, filed on Apr. 18, 2019, provisional application No. 62/885,722, filed on Aug. 12, 2019.

(51) Int. Cl.
| | | |
|---|---|---|
| *G08B 23/00* | (2006.01) | |
| *G08B 21/22* | (2006.01) | |
| *H04W 4/12* | (2009.01) | |
| *H04W 4/02* | (2018.01) | |
| *G08B 25/10* | (2006.01) | |

(52) U.S. Cl.
CPC ............. *G08B 21/22* (2013.01); *G08B 25/10* (2013.01); *H04W 4/023* (2013.01); *H04W 4/12* (2013.01)

(58) Field of Classification Search
CPC ....... G08B 21/22; G08B 25/10; H04W 4/023; H04W 4/12
USPC ....................................................... 340/573.1
See application file for complete search history.

(56) References Cited

U.S. PATENT DOCUMENTS

| | | | | |
|---|---|---|---|---|
| 2013/0217332 | A1* | 8/2013 | Altman | H04W 12/04 455/41.2 |
| 2014/0294257 | A1* | 10/2014 | Tussy | H04W 12/02 382/118 |
| 2015/0269692 | A1* | 9/2015 | Ryan | G06Q 50/18 705/311 |

* cited by examiner

*Primary Examiner* — Tanmay K Shah
(74) *Attorney, Agent, or Firm* — Raymond G. Areaux; J. Matthew Miller, III; Carver, Darden, Koretzky, Tessier, Finn, Blossman & Areaux, LLC

(57) ABSTRACT

Exemplary embodiments provide a system and method for monitoring and alerting when a registered sex offender communicates with the user of a computing device. The system monitors communications occurring through various applications on a computing device, obtains contact information from said communications, and compares said contact information with contact information of a plurality of registered sex offenders stored on a computer server accessible through a computer network.

15 Claims, 5 Drawing Sheets

SYSTEM AND METHOD FOR PROVIDING REGISTERED SEX OFFENDER ALERTS

CROSS-REFERENCE TO RELATED APPLICATIONS

This application claims priority from U.S. Provisional Application No. 62/835,783 (Luzynski), filed Apr. 18, 2019, and U.S. Provisional Application No. 62/885,722 (Luzynski), filed Aug. 12, 2019, which are incorporated herein by reference as if set forth in full below.

BACKGROUND OF THE INVENTION

I. Field

The present invention relates to a system and method for monitoring communications, in particular, on handheld computing devices used by children or others, and providing alerts when communications are received from registered sex offenders, child predators, or other threatening persons.

II. Background

SUMMARY OF THE INVENTION

The present invention provides a monitoring system comprising: a computer server, an alerting application capable of running on an alerting computing device and communicating with said computer server, and a monitoring application capable of running on a monitored computing device and communicating with said computer server, wherein said computer server further comprises a registered sex offender database, wherein said monitoring application is capable of observing usage data from one or more user applications on said monitored computing device and of sending said usage data to said computer server, wherein said computer server is capable of performing a comparison of said usage data with sex offender data contained in said registered sex offender database; wherein said computer server is capable of sending a notification to said alerting application in response to said comparison; and wherein said alerting application is capable of providing a user alert in response to said notification.

Figure 1:
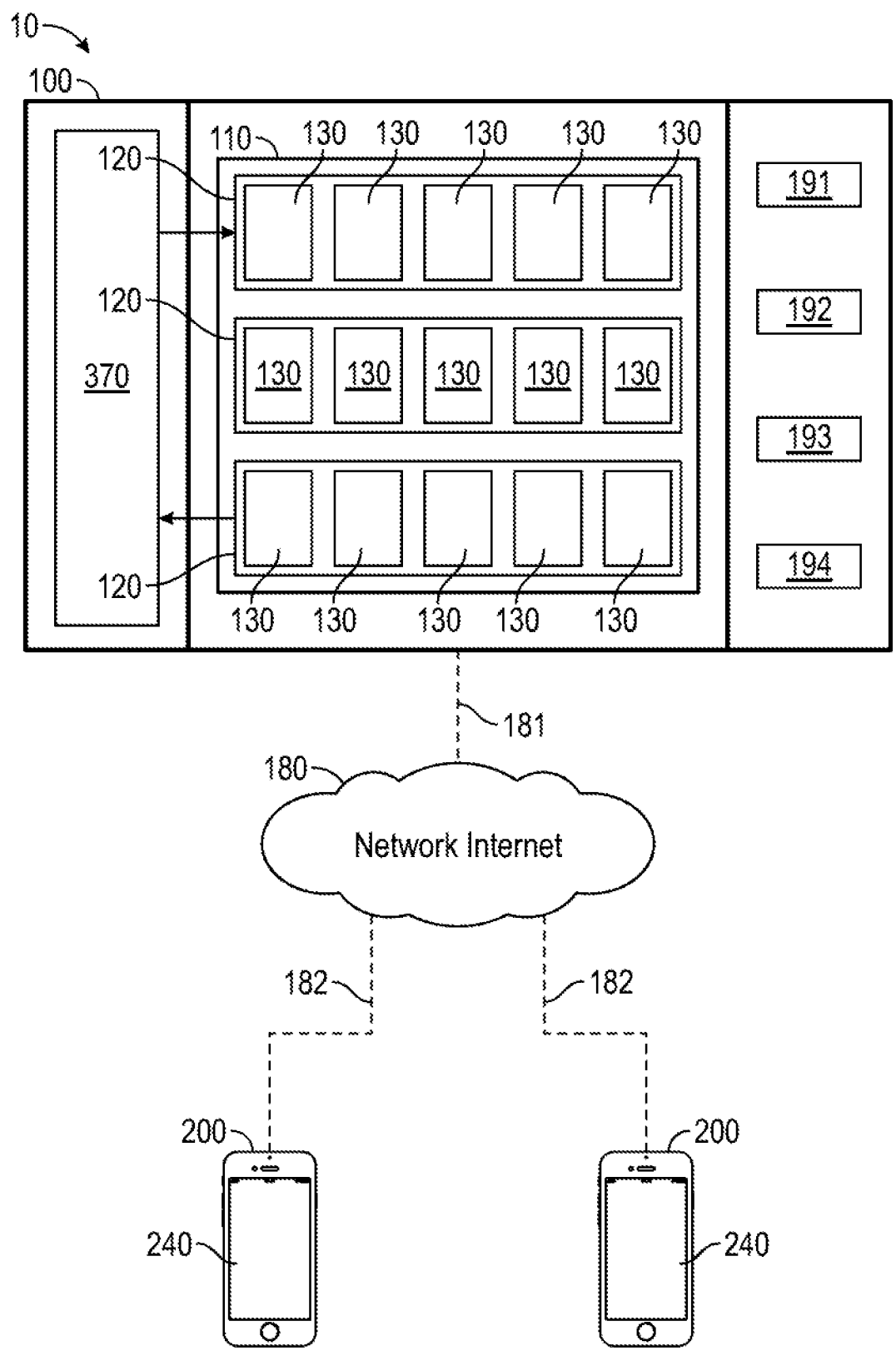
FIG. 1 illustrates a monitoring system.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION OF THE INVENTION

Databases for keeping track of registered sex offenders have been implemented for some time. Initially these databases might keep track of a registered sex offender's place of residence and other traditional descriptive information. However, now most jurisdictions also collect other contact information, including, without limitation, email addresses, phone numbers, secondary phone numbers (i.e., cell phone numbers), as well as user IDs on various social media platforms (e.g., and so not limited to, Twitter, Facebook, and Snapchat) and "gaming handles" (i.e., anonymous or pseudonymous names used to identify a user of a gaming platform when communicating with other users of a gaming platform). Disclosed herein is a system and method of using information collected by jurisdictions or otherwise and stored in a registered sex offender database and other threat databases, in connection with an application running on a computing device (or in connection with an application otherwise obtaining information through other means), to monitor interactions between users of that computing device and others, to provide alerts when users of that computing device interact with a registered sex offender, and to notify authorities when certain conditions are met.

As used herein and in the claims, the term "registered sex offender" means any person who has committed or has been convicted of a crime, as defined by relevant jurisdictions, as requiring that individual to register with an authority providing a registry of information to the public about registering individuals. Such registries are commonly known as "sex offender registries" or "sex offender and child predator registries." The type of crimes committed include, but are not limited to, sex crimes against children. As an example, the State of Louisiana sets forth its rules for registration of sex offenders and child predators in Louisiana Revised Statutes, Title 15, Sections 541-553, and the United States Government sets forth federal rules for registration of sex offenders and child predators in the Adam Walsh Child Protection and Safety Act of 2006, 35 U.S.C. Section 20911 et seq., both of which are incorporated herein by reference.

As used herein and in the claims, the term "threatening person" means any person who has committed acts or who has been convicted of a crime and who others consider to be a threat as a result of those acts or crimes. The term "threatening person" includes, but is not limited to, registered sex offenders.

As used herein and in the claims, the term "registered sex offender database" means a collection of information about registered sex offenders.

As used herein and in the claims, the term "threatening person database" means a collection of information about threatening people.

As used herein and in the claims, the term "computing device" means any suitable computing platform, including, without limitation, handheld computing devices, desktop or laptop personal computers, gaming console devices, smartphones, smart watches or other smart devices, and embedded systems, and such devices may contain, at least, non-transitory storage media, computer memory, one or more processors, wired or wireless networking devices, and input and output devices (including, without limitation, monitors, touch screens, computer mice, and keyboards).

Turning now to the figures, FIG. 1, depicts a monitoring system 10. Monitoring system 10 comprises a plurality of computing devices 200 connected to a computer server 100 via internet 180. More specifically, each of said plurality of computing devices 200 is connected to internet 180 via a connection 182, and computer server is connected to internet 180 via connection 181. Each connection may be a wired or wireless data network connection such as, but not limited to, an IPv4 or IPv6 based network connection. Computer server 100 is one or more computer servers containing, at least, a processor, memory, storage, and an operating system, and capable of running software, including, without limitation, a database server application and a webserver capable of executing program code. Such functionality is commonly provided by a "LAMP stack," which includes the GNU Linux operating system, the Apache webserver, a SQL database such as MySQL, and the PHP hypertext preprocessor, Similar functionality may be provided by Microsoft Windows, Microsoft Internet Information Services (IIS), Microsoft SQL Server, and Microsoft ASP.NET, or combinations of the foregoing or their functional equivalents.

In FIG. 1, computer server 100 comprises query program 110 comprising one or more datasets 120, and each dataset comprising one or more records 130. Query program 110 is one or more computer programs which provide the functionality of accepting queries from computing devices 200 and evaluating said queries across records 130 in one or more datasets 120. In one embodiment, each dataset 120 is the registered sex offender database for a specific jurisdiction (e.g., and so not limited to, for a specific state, county, parish, or city). Query program 110 may be a database server program, an application program, or some combination thereof running on computer server 100. For example, in some embodiments, queries from computing devices 200 may be sent to query program 110, which may process queries in an application program, then perform one or more SQL queries on a database server. Alternatively, in other embodiments, computing devices 200 might interact directly with a database server. Alternatively, in yet other embodiments, query program 110 might respond directly to computing devices 200 without the need for an independent database server program.

In one embodiment, records 130 contain information about registered sex offenders, including, without limitation, at least two of the following: a registered sex offender's name, place of residence, phone number, email address, secondary phone numbers (e.g., and so not limited to, cell phone numbers), and user IDs on various social media platforms (e.g., and so not limited to, Twitter, Facebook, and Snapchat). Records 130 may be organized in various ways inside dataset 120. In one embodiment, records 130 are recorded in a plurality of database tables in third normal form. Datasets 120 and records 130 may also be used to store and retrieve other information as may be helpful to implement the system and method discussed herein.

Some embodiments of records 130 may include information about individuals posing other types of threats, including, without limitation, individuals involved in domestic violence, individuals restrained from contact via a restraining order, individuals convicted of animal abuse, or any person who has committed some type of crime or offense where another is desirous of tracking that person.

Some embodiments may include one or more datasets 120 with records 130 containing information about registered sex offenders and one or more datasets 120 with records containing information about individuals posing other types of threats, as discussed above.

Some embodiments may provide a user interface for a guardian to add records 130, so as to provide a customized list for monitoring in a custom alert database. In these and other embodiments, query program 110 maintains a profile for each child 303. Each profile is stored in one or more records 130, In some embodiments, each child 303 is associated with one or more guardians 305. Furthermore, in some of these embodiments, the records 130 that are added in response to user input may be contained in a one or more distinct datasets 120 (and may be thought of conceptually as a separate database) and each associated with one or more child profiles. The user input may come from a guardian 305 or from a child 303.

Some embodiments may include one or more datasets 120 with records 130 that are a combination of some or all of the foregoing.

Collectively, query program 110, datasets 120, and records 130 provide a registered sex offender database containing a list of registered sex offenders and information (which may include, but is not limited to, contact and residence information) for each registered sex offender.

Collectively, query program 110, datasets 120, and records 130 may also be used to provide a threatening person database containing a list of threatening people and information (which may include, but is not limited to, contact and residence information) for each threatening person.

Figure 2:
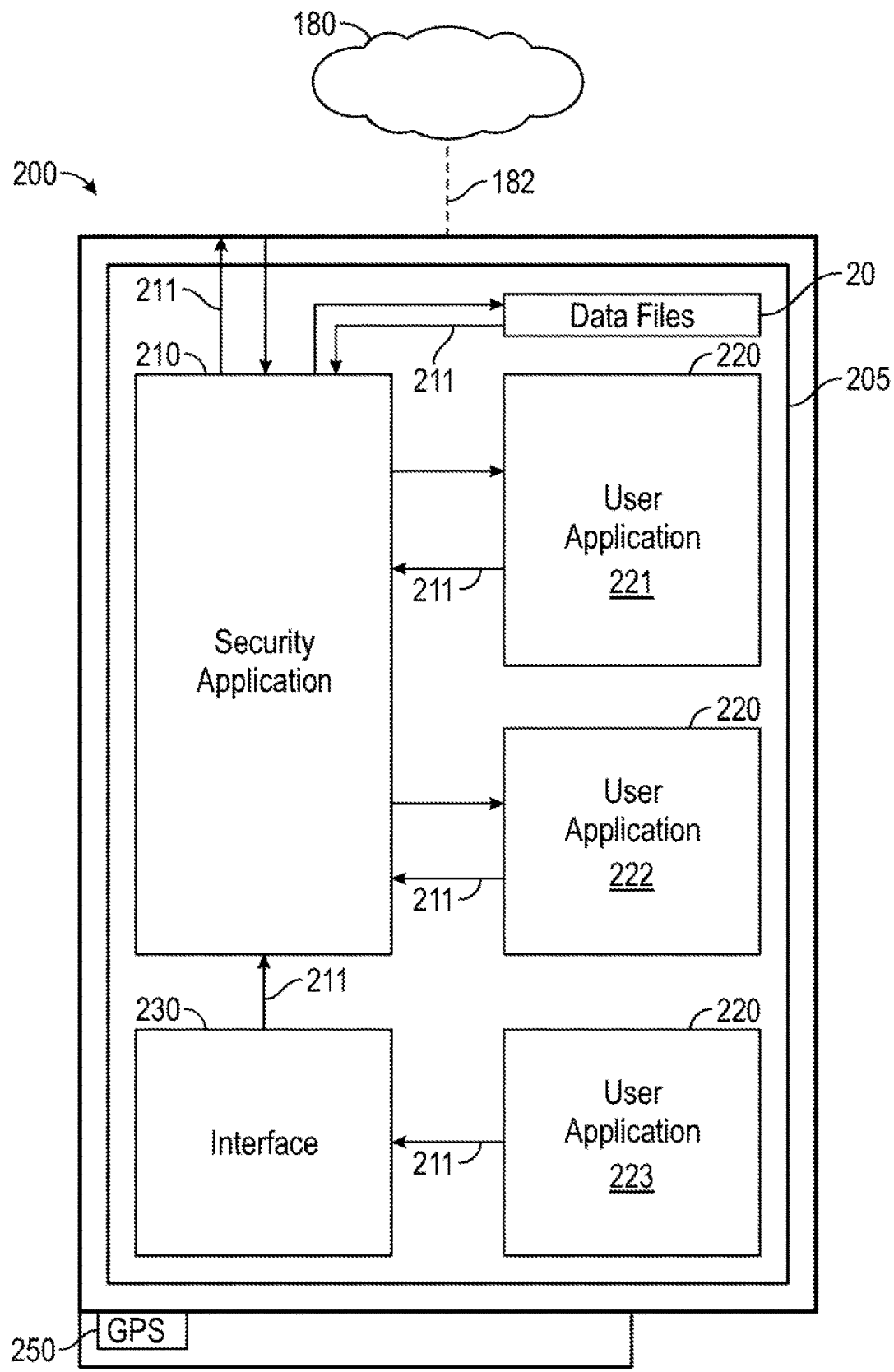
FIG. 2 is a block diagram depicting applications on a computing device of a monitoring system.

FIG. 2 is a block diagram depicting an embodiment of software components of computing device 200. In one embodiment, computing device 200 is a mobile device using the iOS platform such as an Apple iPhone or an Apple iPad. In other embodiments, computing device 200 is a phone or tablet using the Android platform. Some embodiments of monitoring system 10 having a plurality of computing devices 200 may have some of the computing devices 200 use the iOS platform and others use the Android platform. Shown are security application 210, a plurality of user applications 220, and interface 230. User applications 220 are software applications through which a user of computing device 200 can interact with others. In this embodiment, one kind of user application 220 is an audio, audiovisual, or other communications application 221 (including, without limitation, a "phone" application, Apple FaceTime, Skype, or other similar application), another kind of user application 220 is a text messaging or SMS application 222, and another kind of user application 220 is a social media or other similar application 223. In certain embodiments, user application 223 is the Snapchat application.

In the disclosed embodiment, security application 210 is capable of acting either to monitor, to alert, or to both monitor and alert. Accordingly, security application 210 can be configured to monitor usage of the computing device 200 on which it is installed. Configured accordingly, security application 210 acts as a monitoring application. Security application 210 can also be configured to receive notifications from computer server 100 about potential threats based on monitored usage. Configured accordingly, security application 210 operates as an alerting application. Thus, in one embodiment, computer server 100 maintains an account associating that account with one or more computing devices 200, each with security application 210 installed. Conceptually, each computing device 200 is associated with a specific person (e.g., so not limited to, a family member) or type of person (e.g., so not limited to, a child or a guardian), and a guardian 305 may receive notifications about potential threats based on monitored usage of a computing device 200 associated with a child 303, Thus, as discussed more in reference to FIGS. 3A and 3B, a guardian 305 can be informed when a threatening person 301 attempts to communicate with a child 303 or when a child 303 attempts to communicate with a threatening person 301. A guardian 305 may also be informed when that guardian 305 receives messages from a threatening person 301. A guardian 305 may also configure monitoring system 10 to alert, warn or otherwise inform child 303, one or more guardians 305, or others. The number of individuals who may be alerted, warned or otherwise informed is only limited by resource availability.

In some embodiments, computing device 200 can act as both a monitored computing device 390 and an alerting computing device 395, and security application 210 can act as both an alerting application and as a monitoring application. In other embodiments, the functionality may be divided into two or more separate applications.

Security application 210 interacts with user applications 220 to receive usage information 211 from each user application 220. In some embodiments, computing device 200 stores usage information 211 in one or more data files 207. Data files 207 may be textual log files, databases, binary data files, or any other way of storing information. The interaction between security application 210 and user applications 220 may be through reading data files 207, through mechanisms of operating system 205 such as pipes or sockets, through an application program interface ("API") by which security application 210 directly queries a user application 220, through an API by which a user application 220 or an operating system 205 triggers one or more events or interrupts thereby facilitating information exchange, through an interface 230 as described below, or otherwise, to collect or assemble usage information 211. The exchanged usage information 211 is data that is recorded in memory of computing device 200 and can include content of communications to or from the user of the computing device 200, as well as information about such or other communications such as phone number, user id, or other metadata. Some embodiments of user applications 220 do not provide software, API or other programmatic access to this usage information 211. In such cases, usage information 211 needs to be obtained indirectly through an interface 230. Although interface 230 is only shown interacting with user application 223, interface 230 may be used with any user application 220 to achieve data capture or other desired results. In this context, the term "interface" means a method of interaction of two or more software or hardware components. In the depicted embodiment, security application 210 interacts with user application 223 via interface 230. However, security application 210 may be used with a plurality of interfaces 230. It is understood that accessing information indirectly through an interface 230 can be used to access usage information 211 that would otherwise be secured by end-to-end encryption.

In some embodiments, interface 230 utilizes accessibility features of the operating system 205 of computing device 200 to obtain usage information 211 from a user application 220. In such embodiments, a user of computing device 200 configures the operating system 205 of computing device 200 to use security application 210 to provide "screen reader" (i.e., text-to-speech) functionality. When so configured, interface 230 receives textual input from the operating system 205 of computing device 200. Rather than convert such textual input to audio output, interface 230 provides such textual input to security application 210. When acting in this capacity, interface 230 is acting as an accessibility interface.

In other embodiments, interface 230 performs a screen capture of screen 240 and then performs optical character recognition (OCR) on some or all of said screen capture to obtain the textual content of the screen 240. Interface 230 then provides such textual information to security application 210. In some embodiments, the textual content of the screen 240 includes the "user id" or "handle" of a person with whom the user of computing device 200 is communicating via a specific user application 220. When acting in this capacity, interface 230 is acting as an OCR interface. This process is described in more detail with respect to FIG. 4.

Security application 210 also interacts with the operating system 205 of computing device 200 to obtain the current location of computing device 200. This may be referred to as the geospatial location. In an exemplary embodiment, the operating system 205 of computing device 200 obtains the current location of computing device 200 through a global positioning system (GPS) receiver 250 embedded within computing device 200. Other location detection services (e.g., so not limited to, use of cell phone service provider network infrastructure, signal strength triangulation, wi-fi network location, or satellite positioning systems other than GPS, such as GLONASS or other similar systems) may also be used.

As discussed above, security application 210 collects information from various user applications 220. Security application 210 then sends a notification to query program 110 containing some or all of this collected information. Security application 210 may send such a notification upon each communication event (i.e., upon each text message, phone call, social media post, social media messaging, or other communication). However, to conserve resources or for other purposes, security application 210 may provide such notifications periodically in aggregate.

Figure 3A:
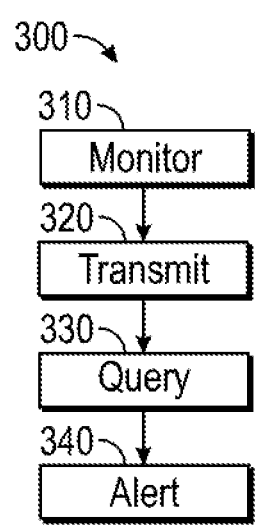
FIG. 3A is a block diagram of a method of operation of a monitoring system.
Figure 3B:
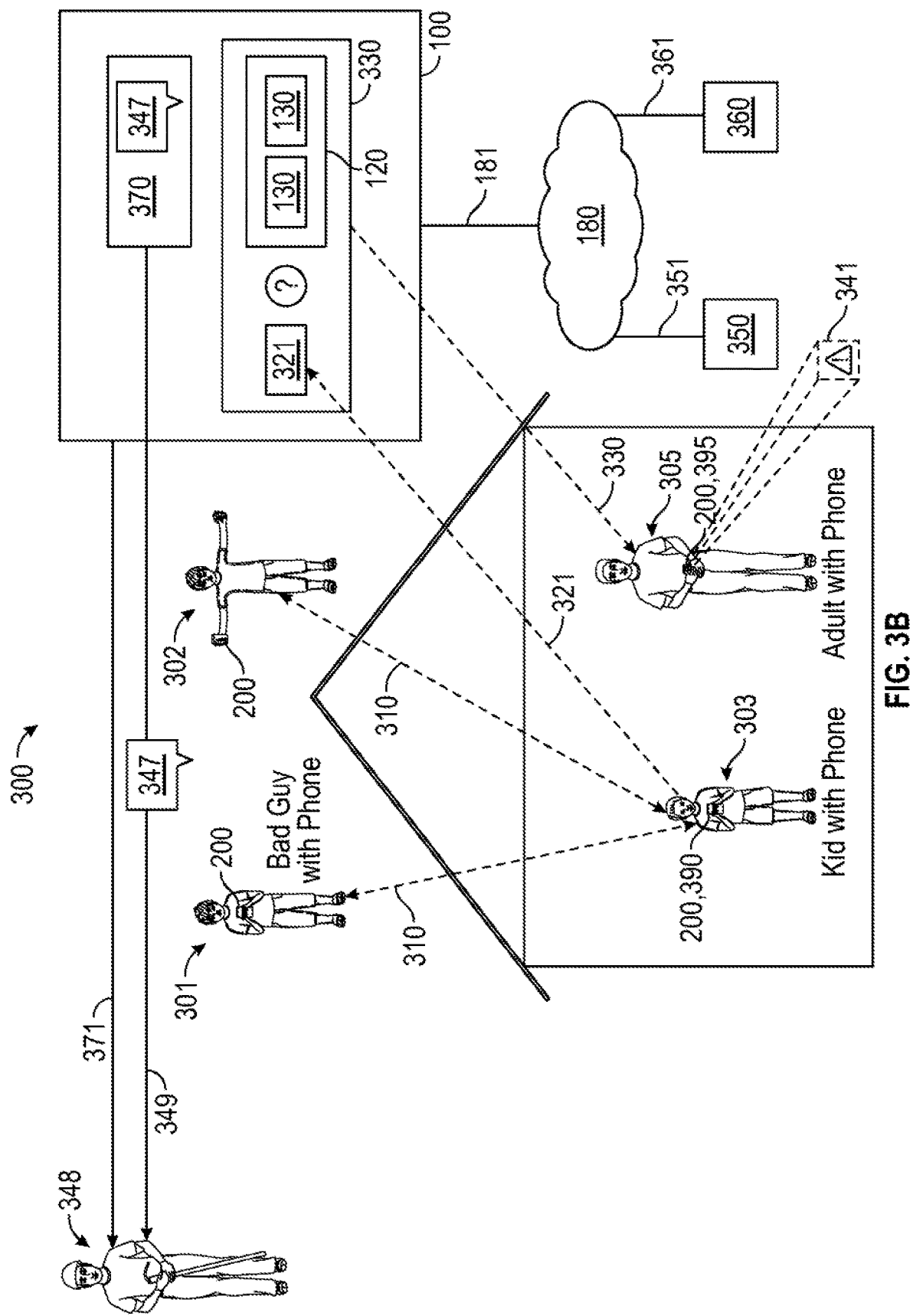
FIG. 3B illustrates a method of operation of a monitoring system.

FIG. 3A shows a block diagram of monitoring method 300 of monitoring system 10, and FIG. 3B illustrates monitoring method 300 of monitoring system 10. FIG. 3B shows threatening person 301 holding a computing device 200, regular person 302 holding a computing device 200, child 303 holding a computing device 200 with security application 210 installed, guardian 305 holding a computing device 200 with security application 210 installed, and a computer server 100.

Threatening person 301 is any person who has information recorded in any dataset 120 of computer server 100 (so, in some embodiments, threatening person 301 may be an individual required by law to register in a jurisdiction as a "sex offender," in other embodiments, threatening person 301 may be any individual that might pose a threat to another as discussed above in the description of datasets 120 and records 130). Regular person 302 is any person who is not listed in the registered sex offender database, the threatening person database, or the custom alert database maintained in one or more datasets 120 and one or more records 130 of computer server 100.

Child 303 is any person using a computing device 200 with security application 210 installed, and where security application 210 is configured to monitor the computing device 200 on which it is installed (i.e., security application 210 is associated with child 303). In this configuration, computing device 200 is a monitored computing device 390 and security application 210 is acting as a monitoring application.

Guardian 305 is any person using a computing device 200 with security application 210 installed, and where security application 210 is configured to receive notifications and alert a user about usage of the computing device 200 associated with child 303. In this configuration, computing device 200 is an alerting computing device 395 and security application 210 is acting as an alerting application. In some embodiments, guardian 305 may be a parent or guardian of child 303. In some embodiments, security application 210 may be installed on two separate computing devices 200 (one for guardian 305 and another for child 303), the two separate computing devices 200 are associated with each other through information stored in one or more records 130 of one or more datasets 120. In some embodiments, this association is may be with a single user account of monitoring system 10, where that user account is stored in one or more records 130 of one or more datasets 120, along with other optional business information, such as, but not limited to, billing information and contact information.

One embodiment of monitoring method 300 includes monitoring step 310, transmitting step 320, querying step 330, and alerting step 340.

In monitoring step 310, a communications event occurs. A communications event may be child 303 using computing device 200 to communicate with another person, or another person communicating with child 303. In other words, a communications event may be incoming or outgoing communications through any user application 220 monitored by security application 210. As depicted, the person receiving messages from, or sending messages to, child 303 may be either threatening person 301 or regular person 302. The depiction of only two individuals is not limiting, as the method works for any number of threatening people 301 and regular people 302.

In monitoring step 310, security application 210 collects information about the communications event from user applications 220 (either directly or through an interface 230). Then, monitoring method 300 proceeds to transmitting step 320.

In one embodiment of monitoring step 310, security application 210 periodically checks data files 207 on monitored computing device 390 to obtain communications information and location information. In this embodiment, monitoring method 300 proceeds to transmitting step 320 after (in some embodiments, immediately after) security application 210 performs the periodic log file check. In these embodiments, security application 210 does not obtain location information in transmitting step 320. In some embodiments, the period of delay between log file checks is 30 minutes, although other periods of delay may be used.

In another embodiment, security application 210 obtains location information from the operating system 205 of monitored computing device 390 through an application program interface (API) whereby the operating system 205 of computing device 200 triggers an event or an interrupt, which provides information to security application 210 when computing device 200 changes location, or, in some embodiments, when computing device 200 changes location significantly. In these embodiments, when security application 210 learns that the location of device 210 has changed, if more than a specified period of time has elapsed since the last occurrence of transmitting step 320, then security application 210 collects usage information 211 and then monitoring method proceeds to transmitting step 320.

In transmitting step 320, security application 210 electronically sends transferred information 321 about communications events (i.e., particular communications or information about said communications obtained from usage information 211), as well as the current location of monitored computing device 390, to query program 110 of computer server 100. In one embodiment, such electronic communications include logs of phone calls and text messages on the monitored computing device 390 (which in some embodiments are stored in data files 207). In one embodiment, such electronic communications are through an application program interface (API), which provides a means of programmatically accessing query program 110, including, without limitation through a SOAP or JSON web service.

In one embodiment of transmitting step 320, security application 210 sends to query program 110 of computer server 100 the phone number, user id, or other information identifying the sender of any incoming communications events to monitored computing device 390 and identifying the recipient of any outgoing communications events from monitored computing device 390. In some embodiments, other information may also be sent to query program 110 of computer server 100, such as the contents of communications (i.e., the text or images of text messages, the body of emails, or other data stored in data files 207).

In transmitting step 320, security application 210 also sends the current location of computing device 200 to query program 110 of computer server 100. In some embodiments, in addition to being performed after monitoring step 310, transmitting step 320 is also performed upon regular intervals. Thus, in these embodiments, the location of a computing device 200 can be monitored even if no communications events occur.

In some embodiments, monitoring step 310 and transmitting step 320 are performed, for some monitored computing devices 390, by accessing a service provider's records. Thus, monitoring step 310 and transmitting step 320 are combined into a single step, wherein query program 110 collects information from a service provider server 350 through an application program interface (API) or other means. Service provider server 350 is a computer server connected to internet 180 via connection 351. The service provider may be a video or voice communications provider, such as a cell phone provider, Skype, or other similar service provider. The service provider may also be a video game platform provider, such as Microsoft, Sony, Nintendo, or Valve. The service provider may also be an email provider, such as Yahoo, Google, or otherwise. In embodiments where the service provider is an email provider, service provider server 350 is an email server, and when query program 110 connects to service provider server 350, query program 110 obtains one or more email messages or one or more email headers to obtain information about email communications (which may include one or more of: sender, recipient, subject line, and message body).

After transmitting step 320 is performed, monitoring method 300 proceeds to querying step 330.

In querying step 330, query program 110 receives information sent by security application 210 of monitored computing device 390 and determines if monitoring method 300 should proceed to alerting step 340. The circumstances described below where monitoring method 300 proceeds to alerting step 340 may be referred to as a "match" (discussed in more detail below, but including, without limitation, where a threatening person 301 communicates with a child 303, or the contents of communications suggest that a child 303 is communicating with a threatening person 301).

In one embodiment, query program 110 determines if monitoring method 300 should proceed to alerting step 340 by comparing transferred information 321 received from security application 210 to determine if such transferred information 321 matches one or more records 130 contained in one or more datasets 120. If a match occurs, then monitoring method 300 proceeds to alerting step 340. In typical embodiments, records 130 and datasets 120 are provided by databases, tables, and records in a relational database server program running on computer server 100 and this comparison and matching function is performed using SQL queries on one or more tables in one or more relational database server programs In other words, and more specifically, in certain embodiments, query program 110 checks to see if the phone number, user id, or other identifying information received from security application 210 of computing device 200 is present in any records 130 identifying a threatening person 301 stored on computer server 100. Thus, query program 110 can perform a comparison of transferred information 321 with data contained in a registered sex offender database, a threatening person database, or a custom alert database, or some combination thereof.

In another embodiment, query program 110 analyzes the content of communications (i.e., the text or images of text messages, the body of emails, or other data stored in data files 207) to determine if the communications pose a potential threat or to grade or rank the potential, if any, of the threat. If communications pose such a threat, or if the grade or ranking exceeds a certain threshold, then monitoring method 300 proceeds to alerting step 340. In this embodiment, query program 110 builds a model of registered sex offender-child communications using a database of prior communications between one or more threatening people 301 and one or more children 303. This model could be, in whole or in part, build by the operation of query program 110 over time. This model may use a machine learning algorithm.

In an embodiment, transferred information 321 received by query program 110 is stored in computer server 100 in one or more records 130 within one or more datasets 120, If a match occurs (i.e., if monitoring method 300 proceeds to alerting step 340), query program 110 stores transferred information 321, or some subset thereof, on computer server 100 for record keeping or archival purposes (i.e., not just within temporary computer memory, but rather, within a long term storage mechanism (i.e., to a computer disk, either directly or via a database or via a dataset 120)), Query program 110 may also keep a record of the reason why transferred information 321 resulted in proceeding to alerting step 340.

In embodiments where security application 210 of computing device 200 sends the location of that computing device 200, query program 110 determines if the location of computing device 200 is within a specified range of one or more locations associated with records 130. If the location is within said specified range, then monitoring method 300 proceeds to alerting step 340. In one embodiment, the specified range is 50 feet. In other embodiments, query program 110 is capable of determining the development status (i.e., whether the location is an urban, suburban, or rural environment) based on commercially-available lookup tables and query program 110 is capable of varying the range depending on the development status. Typically, the range will be smaller in an urban environment than in a suburban environment, and smaller in a suburban environment than in a rural environment. In one embodiment, the range of 10 feet applies to an urban environment, the range of 50 feet applies to a suburban environment, and the range of 200 feet applies to a rural environment.

Query program 110 determines if the location is within the specified range by using an address in an associated record 130 to determine the geospatial address of a threatening person 301 and then comparing the result to the geospatial coordinates of the computing device 200.

In one embodiment, the geospatial address of a threatening person 301 is determined by comparing an address in an associated record to one or more databases containing address-to-geospatial-location coding. In this embodiment, said one or more databases containing address-to-geospatial-location coding are ranked in order of likely accuracy, and query program 110 determines that the geospatial location of a threatening person 301 is the geospatial location in the first database containing geospatial coding, checked in rank order, to contain a record for the address associated with a threatening person 301. In this embodiment, the databases include and are ranked as follows: (1) a first database 191 containing geospatial locations that are human-coded and verified by an operator of query program 110; (2) a second database 192 of human-coded and police-verified geospatial locations created by one or more 911 emergency service providers and police forces; (3) a commercially available postal database 193 providing geospatial locations and a degree of confidence for each geospatial location; (4) data available through the Google Maps API 194. Some or all of first database 191, second database 192, commercially available postal database 193, and Google Maps API 194 may be stored in: (a) one or more records 130 in one or more datasets 120; or (b) a remote server 360 connected to internet 180 via connection 361 and accessed remotely by query program 110. In some embodiments, if a database contains a geospatial location and a degree of confidence for that geospatial location, and if that degree of confidence is low, then query program 110 will proceed to the next-ranked database.

In some embodiments, this query program 110 computationally optimizes this location comparison process by using SQL spatial and mathematical functions. For example, in one embodiment, query program 110 first selects a subset of records 130 by selecting only the records 130 that are within a bounding box and then using trigonometric functions to select, from that subset, the records 130 which are within a radius of a geospatial location. Thus, in this embodiment, the geospatial location of a computing device 200 is a point location and is compared to a geospatial location associated with an address which is also a point location. However, other ways of describing location may be used. For example, the geospatial location associated with an address of a threatening person 301 may be a defined by a circle, a rectangle or other polygon, so as to better define an area of risk. Additionally, the geospatial location associated with an address of a child 303 may be defined by a circle or other shape to encompass an area of uncertainty.

In some embodiments, monitoring method 300 only proceeds to alerting step 340 based on location if the location of computing device 200 is within the specified range for a specified amount of time. In one embodiment, the specified amount of time is sixty minutes.

In some instances, it is desirable not to proceed to alerting step 340. For example, where a monitored computing device 390 passes within the residence of a threatening person 301 regularly (e.g., and so not limited to, on a regular route), the guardian 305 may find it helpful not to receive a location-based alert under certain circumstances. Additionally, where a threatening person 301 is a known safe individual to a guardian 305, the guardian 305 may find it helpful not to receive a communication-based alert, Thus, under these or similar circumstances, a guardian 305 may "mute" certain types of alerts. Where an alert is muted, monitoring method 300 does not proceed to alerting step 340.

In alerting step 340, query program 110 causes one or more security applications 210 to provide a user alert 341 to the user of an alerting computing device 395 by sending a notification to alerting computing device 395. In response, alerting computing device 395 provides a user alert 341 to the holder of alerting computing device 395. In some embodiments, the user alert 341 notifies the user of the alerting computing device 395 that a potential threat has occurred. In other embodiments, the user alert 341 provides more details. In some embodiments, the user alert 341 is in the form of a push notification or text message on alerting computing device 395. In some embodiments, rather than send a notification to an alerting computing device 395, query program 110 may send an email communication to a user's regular email account (i.e., not an alert sent through security application 210), a text message communication to a user's cell phone number, or a letter via traditional mail service. The types of notification may be selected in advance by the user of alerting computing device 395.

In some embodiments, alerting step 340 includes notification of child sex offense authorities 348. In these embodiments, query program 110 or computer server 100 contains one or more datasets 120 containing one or more records 130 which comprise contact instructions for authorities associated with one or more jurisdictions; and, alerting step 340 includes sending an authority notification 347 communicating one or more threats identified in querying step 330 to one or more authorities 348 via communications means 349. This authority notification 347 may be automatic or may occur only after receiving approval from guardian 305. The approval may be on an incident-by-incident basis or may be granted for some or all incidents.

In one embodiment, the child sex offense authorities include one or more individuals or departments within a police or other investigative force responsible for a jurisdiction. The child sex offense authorities may also include the Internet Crimes Against Children (ICAC) Task Force. Notification of child sex offense authorities in this fashion is an improvement because the disclosed system has knowledge of the location of the threatening person 301 or other threatening person 301, whereas the guardian 305 of a child 303 does not know that the location of that threatening person 301. Without knowledge of the location of the threatening person 301 or other threatening person 301, a guardian 305 is limited to notifying the police, child sex offense or other authorities local to the guardian 305. This can cause investigative delays. Knowledge of the location of the threatening person 301 or other threatening person 301 allows the disclosed monitoring system 10 to directly notify the police or other authority in the location of the threatening person 301 or other threatening person 301, thereby speeding investigation.

The communications means 349 of authority notification 347 may be completely or partially automated and may be performed digitally. In various embodiments, the authority notification 347 may be one or more email communications, one or more system messages, or one or more computerized API function calls. In certain embodiments, including those where the communications means 349 is system message, computer server 100 also comprises a registered sex offender database platform 370, which includes computer programs for providing access and management capabilities to authorities for the contents of a registered sex offender database or a threatening person database. FIG. 3B depicts one or more authorities 348 accessing registered sex offender database platform 370 via platform accessing step 371 to review, update, edit, add, or delete data from a registered sex offender database formed by one or more datasets 120 and one or more records 130. In these embodiments, one or more authorities 348 may be notified when an individual acting on behalf of an authority 348 logs in to the registered sex offender database platform 370 operating on computer server 100. Such notifications may take the form of a screen display, a message held within a system inbox, a popup, or otherwise.

As depicted, in FIG. 3B, if threatening person 301 communicates with child 303, the security application 210 installed on the computing device 200 held by child 303 will transmit, for example, the phone number of threatening person 301 to query program 110 on computer server 100. Then, query program 110 will send a message to security application 210 installed on the computing device held by guardian 305 because the phone number of threatening person 301 is contained in a record 130 stored on computer server 100. However, if regular person 302 communicates with child 303, the security application 210 installed on the computing device 200 held by child 303 will likewise transmit, for example, the phone number of regular person 302 to query program 110 on computer server 100, but, query program 110 will not send a message to security application 210 installed on the computing device held by guardian 305 because the phone number of regular person 302 is not contained in a record 130 stored on computer server 100.

Figure 4:
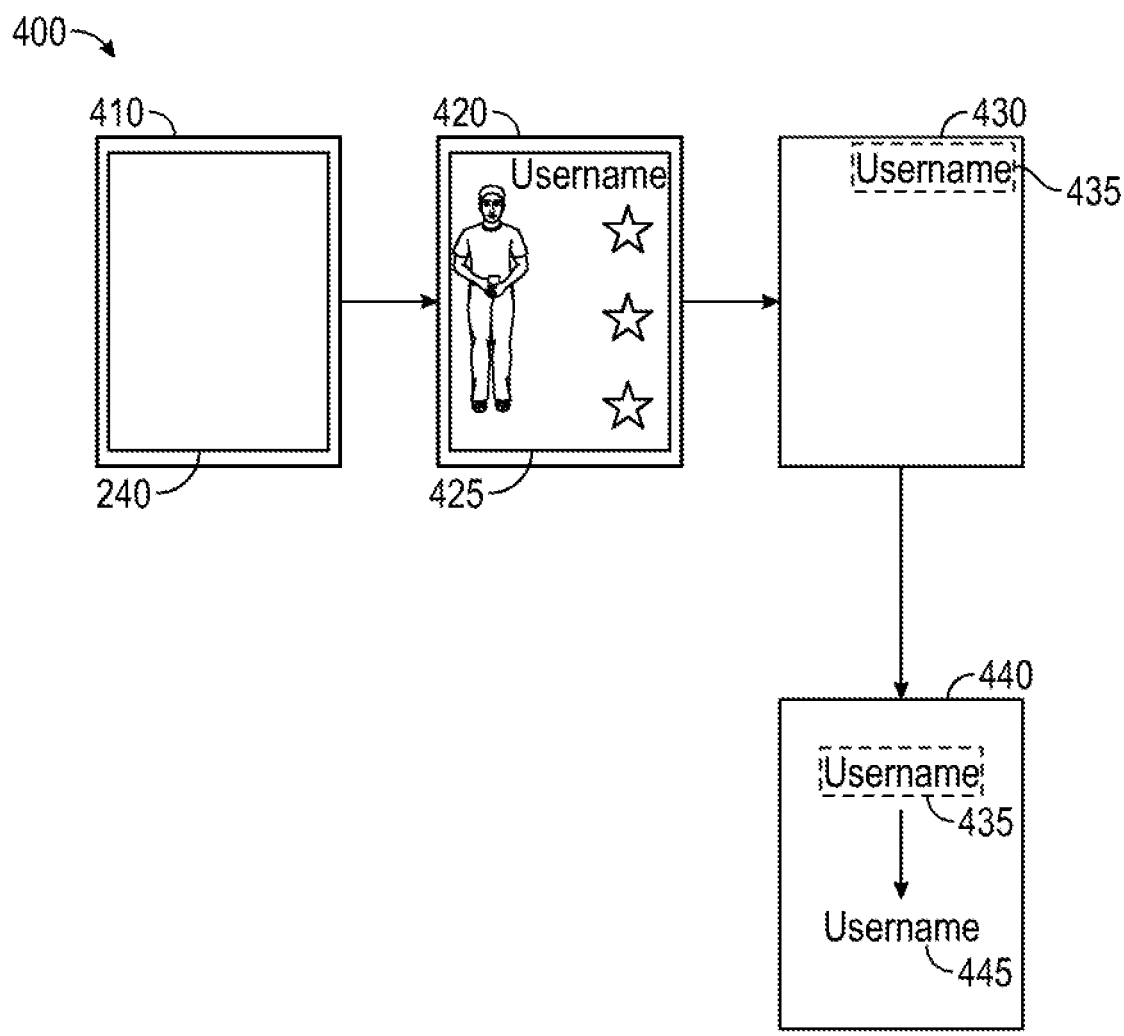
FIG. 4 is a block diagram depicting a process for obtaining information from an application on a computing device.

FIG. 4 depicts extracting method 400 for extracting information via an interface 230. In some embodiments, user applications 220 do not allow security application 210 to obtain information about the contents of messages, or even about the identity (or user id or "handle") of the person with whom the user of a monitored computing device 390 is communicating. One solution to this problem is to use extracting method 400.

In monitoring step 410, interface 230 checks to see if a user application 223 is in the foreground. As discussed herein, user application 223 may be any application where interface 230 is capable of extracting usable information. If so, extracting method proceeds to capturing step 420.

In capturing step 420, interface 230 obtains an image screen capture of screen 240 of monitored computing device 390. Extracting method 400 then proceeds to cropping step 430.

In cropping step 430, interface 230 crops the image screen capture 425 of monitored computing device 390 based on a predetermined setting that is determined based on the size and resolution of the screen 240 of computing device 200, as well as that of user application 223. As a result of said cropping, interface 230 obtains cropped area 435. Extracting method 400 then proceeds to recognizing step 440.

In recognizing step 440, interface 230 performs optical character recognition on the cropped area 435 to obtain text 445. Text 445 is then passed to security application 210, thereby causing a communications event to be received by security application 210 and monitoring step 310 to be performed.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof as permitted as a matter of law.

---

PARTS LIST:
Monitoring system 10
Computer server 100
Query program 110
Dataset 120
Record 130
Internet 180
Connection 181
Connection 182
First database 191
Second database 192
Postal database 193
Google Maps API 194
Computing device 200
Operating system 205
Data files 207
Security application 210
Usage information 211
User application 220
User application 221
User application 222
User application 223
Interface 230
Screen 240
Global positioning system receiver 250
Monitoring method 300
Threatening person 301
Regular person 302
Child 303
Guardian 305
Monitoring step 310
Transmitting step 320
Transferred information 321
Querying step 330
Alerting step 340
User alert 341
Authority notification 347
Authorities 348
Communications means 349
Service provider server 350
Connection 351
Remote server 360
Connection 361
Registered sex offender database platform 370
Accessing step 371
Monitored computing device 390
Alerting computing device 395
Extracting method 400
Monitoring step 410
Capturing step 420
image screen capture 425
Cropping step 430
Cropped area 435
Recognizing step 440
Text 445

---

That which is claimed is:

1. A monitoring system comprising: a computer server, an alerting application capable of running on an alerting computing device and communicating with said computer server, and a monitoring application capable of running on a monitored computing device and communicating with said computer server, wherein said computer server further comprises a registered sex offender database,
wherein said monitoring application is capable of observing usage data from one or more user applications on said monitored computing device and of sending said usage data to said computer server,
wherein said computer server is capable of performing a comparison of said usage data with sex offender data contained in said registered sex offender database;
wherein said computer server is capable of sending a notification to said alerting application in response to said comparison; and
wherein said alerting application is capable of providing a user alert in response to said notification,
wherein said sex offender data includes one or more residences of one or more registered sex offenders, said usage data includes a geospatial location of said monitoring computing device, and said comparison includes determining whether said geospatial location of said monitoring computing device is within a predetermined distance of any of said one or more residences,
wherein said comparison includes first selecting a bounded subset of said one or more residences within a bounding box and second determining if any of said bounded subset is within said predetermined distance.

2. A monitoring system comprising: a computer server, an alerting application capable of running on an alerting computing device and communicating with said computer server, and a monitoring application capable of running on a monitored computing device and communicating with said computer server, wherein said computer server further comprises a registered sex offender database,
wherein said monitoring application is capable of observing usage data from one or more user applications on said monitored computing device and of sending said usage data to said computer server,
wherein said computer server is capable of performing a comparison of said usage data with sex offender data contained in said registered sex offender database;
wherein said computer server is capable of sending a notification to said alerting application in response to said comparison; and
wherein said alerting application is capable of providing a user alert in response to said notification,
wherein said sex offender data includes one or more residences of one or more registered sex offenders, said usage data includes a geospatial location of said monitoring computing device, and said comparison includes determining whether said geospatial location of said monitoring computing device is within a predetermined distance of any of said one or more residences,
wherein said computer server comprises a plurality of address-to-geospatial-location databases, said plurality of address-to-geospatial-location databases is ordered based on accuracy, and said computer server is capable of sequentially querying said plurality of address-to-geospatial location databases until one of said address-to-geospatial-location databases contains an identified geospatial location for at least one of said one or more residences.

3. The monitoring system of claim 2, wherein at least one of said plurality of address-to-geospatial-location databases contains a degree of confidence for at least one geospatial location and wherein said computer server continues sequentially querying said plurality of address-to-geospatial location databases until said identified geospatial location is not associated with a low degree of confidence.

4. A monitoring system comprising: a computer server, an alerting application capable of running on an alerting computing device and communicating with said computer server, and a monitoring application capable of running on a monitored computing device and communicating with said computer server, wherein said computer server further comprises a registered sex offender database,
- wherein said monitoring application is capable of observing usage data from one or more user applications on said monitored computing device and of sending said usage data to said computer server,
- wherein said computer server is capable of performing a comparison of said usage data with sex offender data contained in said registered sex offender database;
- wherein said computer server is capable of sending a notification to said alerting application in response to said comparison; and
- wherein said alerting application is capable of providing a user alert in response to said notification,
- wherein said computer server comprises one or more profiles and a database of custom data containing one or more custom records, each of said custom records associated with one or more of said profiles, wherein said monitored computing device is associated with one of said one or more profiles, and wherein said computer server is capable of performing a second comparison of said usage data with said custom records associated said one of said one or more profiles associated with said monitored computing device.

5. The monitoring system of claim 4, wherein said computer server is capable of adding to said database of custom data in response to user input.

6. In a monitoring and alert system with a child computing device, with a guardian computing device, with a registered sex offender computing device and with a host control computing system hosting a sex offender database and running a host control program, a monitor and alert subsystem comprising:
- a. child software capable of being installed on said child computing device and, when installed on said child computing device, capable:
  - i. of monitoring child data from one or more user applications installed on said child computing device wherein said user applications communicate with said registered sex offender computing device; and,
  - ii. of transmitting said child data to said host control computing system;
- b. guardian software capable of being installed on said guardian computing device and, when installed on said guardian computing device, capable of causing a sex offender risk alert to occur on said guardian computing device; and
- wherein, after said host control computing system receives child data from said child computing device, said host control program performs a comparison of said received child data to said sex offender database, identifies a match of said received child data with said sex offender database and communicates said match to said guardian computing device, said guardian software is capable of causing said sex offender risk alert to occur on said guardian computing device,
- wherein said sex offender database includes one or more residences of one or more registered sex offenders, said child data includes a geospatial location of said child computing device, and said comparison includes determining whether said geospatial location of said child computing device is within a predetermined distance of any of said one or more residences,
- wherein said comparison includes first selecting a bounded subset of said one or more residences within a bounding box and second determining if any of said bounded subset is within said predetermined distance.

7. In a monitoring and alert system with a child computing device, with a guardian computing device, with a registered sex offender computing device and with a host control computing system hosting a sex offender database and running a host control program, a monitor and alert subsystem comprising:
- a. child software capable of being installed on said child computing device and, when installed on said child computing device, capable:
  - i. of monitoring child data from one or more user applications installed on said child computing device wherein said user applications communicate with said registered sex offender computing device; and,
  - ii. of transmitting said child data to said host control computing system;
- b. guardian software capable of being installed on said guardian computing device and, when installed on said guardian computing device, capable of causing a sex offender risk alert to occur on said guardian computing device; and
- wherein, after said host control computing system receives child data from said child computing device, said host control program performs a comparison of said received child data to said sex offender database, identifies a match of said received child data with said sex offender database and communicates said match to said guardian computing device, said guardian software is capable of causing said sex offender risk alert to occur on said guardian computing device,
- wherein said sex offender database includes one or more residences of one or more registered sex offenders, said child data includes a geospatial location of said child computing device, and said comparison includes determining whether said geospatial location of said child computing device is within a predetermined distance of any of said one or more residences,
- wherein said host control computing system comprises a plurality of address-to-geospatial-location databases, said plurality of address-to-geospatial-location databases is ordered based on accuracy, and said host control program is capable of sequentially querying said plurality of address-to-geospatial location databases until one of said address-to-geospatial-location databases contains an identified geospatial location for at least one of said one or more residences.

8. The monitor and alert subsystem of claim 7, wherein at least one of said plurality of address-to-geospatial-location databases contains a degree of confidence for at least one geospatial location and wherein said host control program continues sequentially querying said plurality of address-to-geospatial location databases until said identified geospatial location is not associated with a low degree of confidence.

9. In a monitoring and alert system with a child computing device, with a guardian computing device, with a registered sex offender computing device and with a host control computing system hosting a sex offender database and running a host control program, a monitor and alert subsystem comprising:
- a. child software capable of being installed on said child computing device and, when installed on said child computing device, capable:
  - i. of monitoring child data from one or more user applications installed on said child computing device wherein said user applications communicate with said registered sex offender computing device; and, ii. of transmitting said child data to said host control computing system;

b. guardian software capable of being installed on said guardian computing device and, when installed on said guardian computing device, capable of causing a sex offender risk alert to occur on said guardian computing device; and wherein, after said host control computing system receives child data from said child computing device, said host control program performs a comparison of said received child data to said sex offender database, identifies a match of said received child data with said sex offender database and communicates said match to said guardian computing device, said guardian software is capable of causing said sex offender risk alert to occur on said guardian computing device, wherein said host control computing system comprises one or more profiles and a database of custom data containing one or more custom records, each of said custom records associated with one or more of said profiles, wherein said child computing device is associated with one of said one or more profiles, and wherein said host control program is capable of performing a second comparison of said child data with said custom records associated said one of said one or more profiles associated with said child computing device.

10. The monitor and alert subsystem of claim 9, wherein said host control program is capable of adding to said database of custom data in response to user input.

11. A monitoring and alert system comprising:

a. a host control computing system hosting a sex offender database and running a host control program capable of receiving communications from a child computing device, a guardian computing device, and a registered sex offender computing device;

b. a receiving subroutine of said host control program capable of receiving child data from child software installed on said child computing device, wherein said child software is capable of monitoring one or more user applications installed on said child computing device to obtain said child data wherein said user applications communicate with said registered sex offender computing device; and, c. an alerting subroutine of said host control program capable sending a communication to guardian software installed on said guardian computing device, and wherein said guardian software is capable of causing a sex offender risk alert to occur on said guardian computing device in response to said communication; and wherein, after said receiving subroutine performs a comparison of said received child data to said sex offender database and identifies a match of said received child data with said sex offender database, said monitor and alert subsystem causes said alerting subroutine to run, wherein said sex offender database includes one or more residences of one or more registered sex offenders, said child data includes a geospatial location of said child computing device, and said comparison includes determining whether said geospatial location of said child computing device is within a predetermined distance of any of said one or more residences, wherein said comparison includes first selecting a bounded subset of said one or more residences within a bounding box and second determining if any of said bounded subset is within said predetermined distance.

12. A monitoring and alert system comprising:

a. a host control computing system hosting a sex offender database and running a host control program capable of receiving communications from a child computing device, a guardian computing device, and a registered sex offender computing device;

b. a receiving subroutine of said host control program capable of receiving child data from child software installed on said child computing device, wherein said child software is capable of monitoring one or more user applications installed on said child computing device to obtain said child data wherein said user applications communicate with said registered sex offender computing device; and, c. an alerting subroutine of said host control program capable sending a communication to guardian software installed on said guardian computing device, and wherein said guardian software is capable of causing a sex offender risk alert to occur on said guardian computing device in response to said communication; and wherein, after said receiving subroutine performs a comparison of said received child data to said sex offender database and identifies a match of said received child data with said sex offender database, said monitor and alert subsystem causes said alerting subroutine to run, wherein said sex offender database includes one or more residences of one or more registered sex offenders, said child data includes a geospatial location of said child computing device, and said comparison includes determining whether said geospatial location of said child computing device is within a predetermined distance of any of said one or more residences, wherein said host control computing system comprises a plurality of address-to-geospatial-location databases, said plurality of address-to-geospatial-location databases is ordered based on accuracy, and said host control program is capable of sequentially querying said plurality of address-to-geospatial location databases until one of said address-to-geospatial-location databases contains an identified geospatial location for at least one of said one or more residences.

13. The monitoring and alert system of claim 12, wherein at least one of said plurality of address-to-geospatial-location databases contains a degree of confidence for at least one geospatial location and wherein said host control program continues sequentially querying said plurality of address-to-geospatial location databases until said identified geospatial location is not associated with a low degree of confidence.

14. A monitoring and alert system comprising:

a. a host control computing system hosting a sex offender database and running a host control program capable of receiving communications from a child computing device, a guardian computing device, and a registered sex offender computing device;

b. a receiving subroutine of said host control program capable of receiving child data from child software installed on said child computing device, wherein said child software is capable of monitoring one or more user applications installed on said child computing device to obtain said child data wherein said user applications communicate with said registered sex offender computing device; and, c. an alerting subroutine of said host control program capable sending a communication to guardian software installed on said guardian computing device, and wherein said guardian software is capable of causing a sex offender risk alert to occur on said guardian computing device in response to said communication; and wherein, after said receiving subroutine performs a comparison of said received child data to said sex offender database and identifies a match of said received child data with said sex offender database, said monitor and alert subsystem causes said alerting subroutine to run, wherein said host control computing system comprises one or more profiles and a database of custom data containing one or more custom records, each of said custom records associated with one or more of said profiles, wherein said child computing device is associated with one of said one or more profiles, and wherein said host control program is capable of performing a second comparison of said child data with said custom records associated said one of said one or more profiles associated with said child computing device.

15. The monitoring and alert system of claim 14, wherein said host control program is capable of adding to said database of custom data in response to user input.

\* \* \* \* \*